United States Patent [19]

Anderson

[11] Patent Number: 5,617,425
[45] Date of Patent: Apr. 1, 1997

[54] DISC ARRAY HAVING ARRAY SUPPORTING CONTROLLERS AND INTERFACE

[75] Inventor: David B. Anderson, Minnetonka, Minn.

[73] Assignee: Seagate Technology, Inc., Scotts Valley, Calif.

[21] Appl. No.: 67,677

[22] Filed: May 26, 1993

[51] Int. Cl.⁶ .................................................. G06F 11/00
[52] U.S. Cl. .................. 371/10.2; 395/182.03; 395/182.04
[58] Field of Search ................... 371/10.2, 21.1, 371/40.1, 40.2, 40.4; 395/182.03, 182.04

[56] References Cited

U.S. PATENT DOCUMENTS

| | | | |
|---|---|---|---|
| Re. 34,100 | 10/1992 | Hartness | 371/40.1 |
| 4,870,643 | 9/1989 | Bultman et al. | 371/11.1 |
| 5,148,432 | 9/1992 | Gordon et al. | 371/10.1 |
| 5,191,184 | 3/1993 | Shin | 219/10.55 |
| 5,191,584 | 3/1993 | Anderson | 371/51.1 |
| 5,210,860 | 5/1993 | Pfeffer et al. | 395/575 |
| 5,212,799 | 5/1993 | Walrath et al. | 395/800 |
| 5,220,569 | 6/1993 | Hartness | 371/37.7 |
| 5,289,418 | 2/1994 | Youngerth | 365/201 |
| 5,331,646 | 7/1994 | Krueger et al. | 371/40.1 |

OTHER PUBLICATIONS

"A Case for Redundant Arrays of Inexpensive Disks (RAID)" by David A. Patterson et al., Report No. UCB/CSD 87/391, Dec. 1987, *Computer Science Division (EECS), University of California, Berkeley, California 94720.*

*Primary Examiner*—Robert W. Beausoliel, Jr.
*Assistant Examiner*—Phung Chung
*Attorney, Agent, or Firm*—Westman, Champlin & Kelly, P.A.

[57] ABSTRACT

A disc array includes a plurality of disc drives each having a magnetic disc for storing information, and a drive controller for accessing information on the disc. The drive controller performs array support functions to support the disc array. The drive controllers in each disc drive are coupled to one another so that the drive controllers can communicate to perform array support functions in cooperation with one another. An array controller is coupled to the drive controllers and each of the plurality of disc drives to control overall operation of the disc drives to store and retrieve information from target locations on the magnetic discs in the disc drives.

36 Claims, 7 Drawing Sheets

DISC ARRAY HAVING ARRAY SUPPORTING CONTROLLERS AND INTERFACE

INCORPORATION BY REFERENCE

U.S. Pat. No. Re 34,100 reissued to Hartness on Oct. 13, 1992, and assigned to the same assignee as the present invention is hereby fully incorporated by reference.

The article entitled *A Case for Redundant Arrays of Inexpensive Discs (RAID)* by Patterson, Gibson and Katz made available in December 1987 as Report No. UCB/CSD 87/391 from the Computer Science Division of the University of California Berkeley, California 94720, is hereby incorporated by reference.

BACKGROUND OF THE INVENTION

The present invention deals with storing data on magnetic discs. More particularly, the present invention deals with storing information on a disc array which includes a plurality of magnetic disc drives.

A typical magnetic disc drive includes one or more magnetic discs, a transducer supported by a hydrodynamic air bearing which flies above each magnetic disc, and a drive controller for controlling the disc drive based on commands received from a host system. The drive controller controls the disc drive to retrieve information from the magnetic discs and to store information on the magnetic discs.

Information is typically stored on the magnetic discs by providing a write signal to the transducer to encode flux reversals on the surface of the magnetic disc representing the data to be stored. In retrieving data from the magnetic disc, the drive controller controls the transducer to fly above the magnetic disc, sensing the flux reversals on the magnetic disc and generating a read signal based fin those flux reversals. The read signal is then decoded by the drive controller to recover the data represented by the flux reversals stored on the magnetic disc, and consequently represented in the read signal provided by the transducer.

The drive controllers for individual disc drives have typically included one of two different types. The first type is referred to as a device level controller (or a device level interface). The device level controller has a relatively small amount of intelligence. The information stored on the drive is simply read from the disc and converted to a usable form for a host system. An example of a device level controller is the ESDI controller.

A second type of controller is referred to as an intelligent interface or an intelligent controller. An intelligent interface includes a full controller which communicates with a host system. Such intelligent interfaces include the IDE and SCSI interfaces. For instance, the Elite SCSI interface manufactured by Seagate Technology Corp. presently provides intelligent performance equivalent to an original IBM PC/AT personal computer.

Since, the intelligent interfaces include full controllers, they not only arrange the data to be usable by the host system, but they are also suitable for implementing error correction code (ECC) information to detect and reconstruct certain errors which occur while reading data from the discs. The number of correctable errors is dependent on the particular ECC information being used.

In today's disc drive industry, storage of information utilizing disc drive arrays is gaining popularity. A disc drive array includes a plurality of disc drives which are coupled to an array controller. The array controller controls operation of each of the plurality of disc drives to store information. The array controller also typically controls the disc drive array so that, should one disc drive fail, the information stored on that disc drive can be recovered using information stored on the remaining disc drives in the disc array.

Because the information stored in a disc drive array is often much more valuable than the disc drives themselves, drive arrays are often referred to as Redundant Arrays of Inexpensive Discs (RAID). Several types of RAID systems or RAID levels are known.

First level RAID is characterized by providing mirrored discs. In first level RAID, all discs in the array are duplicated. Thus, should one disc or disc drive fail, the information is not lost since that exact information is mirrored on another disc drive. This is a very expensive option for implementing a disc drive array because of the duplicity of hardware.

Second level RAID includes a Hamming Code for error correction. In second level RAID, data is bit-interleaved across the discs of a group and check discs are added to detect and correct a single error. This has the disadvantage that if a read is directed to only a small amount of data, a full sector from each of the bit-interleaved discs in the group must still be read. Also, writing of a single unit still involves a read-modify-write cycle on all of the discs in the group.

Third level RAID is characterized by having a single check disc per group of discs. In third level RAID, the extra check discs used in second level RAID for storing error correction code information are eliminated. Rather, as the data is being stored to the disc array, (ECC) information is appended to the data. Also, a single disc or disc drive is used to store redundant data corresponding to the data stored in the array. When reading information from the array, the ECC information is used to determine whether an error has occurred, and which disc contains the error. Then, the information on the failed disc is reconstructed by calculating the parity of the remaining good discs and comparing bit-by-bit to the parity information that was calculated for the original full group of data and that was stored on the redundant or parity disc drive.

Fourth level RAID is characterized by being arranged so that it provides for independent reads and writes. In second and third level RAIDs, information stored in the array is spread across all of the discs in the group. Thus, any read or write operation to one disc in the group requires reading or writing all discs in the group. Fourth level RAID improves performance of small transfers by providing the ability to do more than one I/O operation per group of discs at any given time. Each data sector is no longer spread across several discs. Rather, each data sector stored in the array is kept as an individual unit on a single disc. The information stored in the array is interleaved among data discs on a sector level rather than at the bit level.

In fifth level RAID, both the data to be stored to the array, as well as the parity or redundant data, is spread over all discs in a group. Thus, there is no single check disc. While fourth level RAID allowed more than one read to be performed per group at any given time, it was still limited to one write per group since each write requires accessing the check disc. Fifth level RAID distributes the data and check information per sector across all the discs, including the check discs. Therefore, fifth level RAID can support multiple individual write operations per group. Since the check information for each sequential location is on a different disc in the group, the write operations can be performed in parallel since there is no need to sequentially access any one disc at a given time.

While the above discussion has provided an overview of some of the main differences between the different level RAID systems, a more detailed description of those differences along with illustrative examples is provided in the article entitled *A CASE FOR REDUNDANT ARRAYS OF INEXPENSIVE DISCS (RAID)*, by Patterson, Gibson, and Katz, incorporated herein by reference.

Because of the characteristic differences between RAID 3 and RAID 4 and 5 type systems, the different systems are particularly well suited to different needs. The RAID 3 system has typically been suitable for, and demonstrated superior performance in, array systems which are required to exhibit a high data transfer rate. RAID 4 and 5 systems, on the other hand, typically demonstrate superior performance in disc arrays which are used in high aggregate input/output (I/O) applications. Such implementations are often found in business applications or with many UNIX users.

One problem with all array products, regardless of the RAID level, is that the array controller is called upon to perform many time consuming array support functions. For example, in a traditional write request wherein data is to be written to a target data sector, the typical RAID 5 controller performs the following steps:

1. Read the old data from the target sector;
2. Write the new data into the target sector;
3. Read parity data stored in a parity sector which corresponds to the target sector;
4. Exclusive OR the old data retrieved from the target sector with the new data written to the target sector;
5. Exclusive OR the result of step 4 above with the old parity data to provide new parity data; and
6. Write the new parity data from step 5 into the parity sector.

This sequence is typically referred to as a read-modify-write sequence. Since large system caches in today's UNIX systems result in most reads being serviced from main memory, write operations tend to be a very high percentage of the total I/O operations in a disc array system. This has been found to be a critical problem with a RAID 5 controller (e.g., when supporting UNIX, the RAID 5 controller is heavily burdened because it must perform four I/O operations for each write request).

Other array support functions traditionally performed by the array controller also provide significant overburdening of the array controller. Such functions include a reconstruction function which is implemented when, :for example, a single disc drive has failed. Upon detecting the failure, the array controller must retrieve data from all of the other disc drives, reconstruct the lost data and rebuild the entire failed disc drive one sector at a time. This imposes a significant burden on the already overtaxed RAID 5 array controller.

Another disadvantage with typical disc array systems is that the generic disc array model can be described as a two dimensional matrix of disc drives. This model requires a single array controller to control a large number of disc drives. Such a model can cause severe performance problems. For example, typical SCSI performance limitations and controller task burdening (i.e., the burden caused by the many concurrent events the controller must manage during heavy I/O activity) can cause significant degradation in performance. In addition, the controller is relatively expensive when only one or two rows of disc drives are attached.

Another limitation of this traditional model is that its economics are more or less fixed. For example, if one customer would like a 4+1 array (meaning 4 data disc drives and 1 parity disc drive), that customer must find a controller which has that particular organization. If the customer wants an 8+1 array, only those controllers having the appropriate organization are acceptable. The greater the number of interfaces, the more attractive the array because the cost of the parity drive is then amortized over more data drives. This would intuitively lead to the conclusion that an array as wide as possible is desirable.

However, there are two significant disadvantages which get worse as the array gets wider. The first is that in order to support a wide array, the cost and complexity of the controller increase and the granularity gets unacceptable. That is, the minimum number of discs that have to be added to the matrix—one row—gets to be so much storage capacity that the minimum capacity increments are both unwieldy and quite expensive.

The second disadvantage is that speed suffers greatly with a wide array. As more discs get added to the array, the performance gets progressively worse. The I/O levels that must be supported in a typical array have been aggravated by huge memory caches. Operation of these caches results in very high write percentages, which, in turn, cause a multiplication of the number of I/O operations that an array controller must perform. This is due to the fact that a RAID 5 subsystem must read old data and parity sectors and rewrite them to complete what would have been a simple write operation in a standard disc subsystem.

The combination of the increased percentage of write operations, and the complexity of the array controller cause such an array controller to be far too expensive with one or two rows of disc drives, and far too slow even with few disc drives, but especially with .multiple rows of disc drives.

SUMMARY OF THE INVENTION

The present invention is a disc array having a plurality of disc drives each including at least one magnetic disc for storing information, and a drive controller for controlling the disc drive to store information on the disc and to retrieve information from the disc. The drive controller includes means for performing array support functions to support the disc array. Connection means connects the drive controller in each of the plurality of disc drives so that the drive controllers can communicate with one another to perform the array support functions in cooperation with one another. An array controller is coupled to the drive controllers for controlling the disc drives to store and retrieve information from target locations on the magnetic discs.

By providing the drive controllers in each of the plurality of disc drives with means for performing the array support functions, many of the onerous burdens previously placed on the array controller are alleviated, and performance of the array is greatly improved.

DETAILED DESCRIPTION OF THE PREFERRED EMBODIMENTS

1. Prior Art RAID Level 5 System 10

Figure 1:
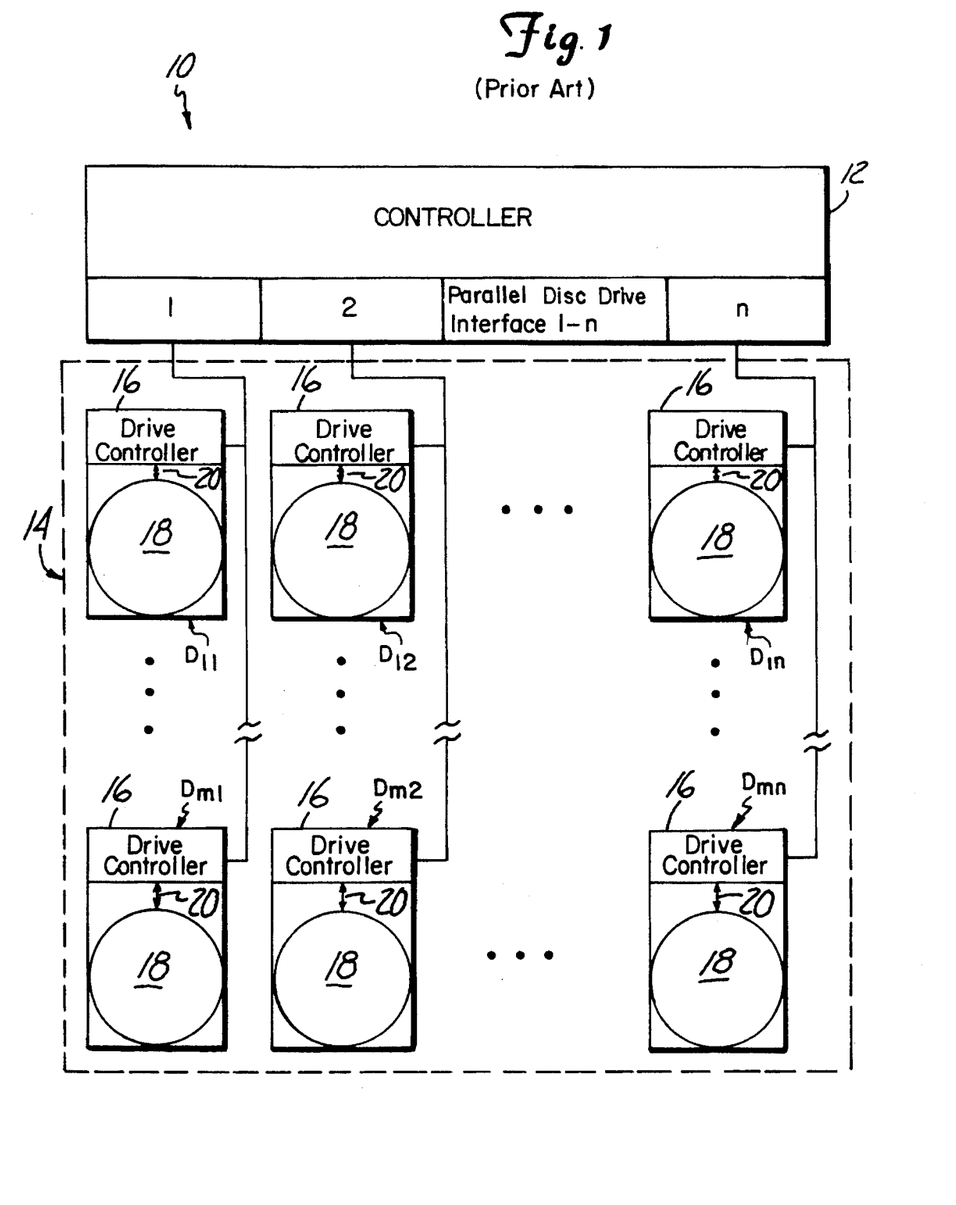
FIG. 1 is a block diagram of a prior art disc drive array.

FIG. 1 is a block diagram of array controller 10 of the prior art. Array controller 10 includes controller 12, parallel disc drive interfaces 1-n and a plurality of disc drives. The plurality of disc drives are arranged in a disc drive matrix 14 having n disc drives in each row and m rows of disc drives. Each disc drive in the matrix 14 of disc drives has its position identified by $D_{xy}$ where x indicates the row in which the disc drive is located and y indicates the column in which the disc drive is located. Each disc drive $D_{11}$–$D_{mn}$ includes a disc drive controller 16 and a magnetic disc 18, as well as means, controlled by drive controller 16, for accessing disc 18 to encode information on disc 18 and retrieve encoded information from disc 18. The means for accessing disc 18 is indicated by arrow 20, and in the preferred embodiment, is a magnetic transducer coupled to a hydrodynamic air bearing and positionable with respect to disc 18.

In traditional disc drive array 10, interfaces 1-n are common parallel disc drive interfaces which provide for communication between the drive controller of each disc drive in matrix 14 and controller 12. However, the interfaces 1-n do not provide for substantial communication between the drive controllers of each of the disc drives in the array. Thus, array support functions are cumbersome for array controller 10.

In a RAID 5 implementation, in order to write data to one of the rows of disc drives in matrix 14, given the parallel interfaces 1-n, and the fact that the disc drive controllers 16 cannot communicate with one another to perform array support functions, controller 12 is unduly burdened. In order to perform a single write operation, controller 12 performs essentially six steps.

For example, assume that disc drive $D_{12}$ holds a target location to which controller 12 will write data. Controller 12 first reads the data from drive $D_{12}$ which is already stored in the target location. Also, assume that disc drive $D_{11}$ holds the redundant or parity data corresponding to the target location. After reading the old data from the target location on drive $D_{12}$, controller 12 then reads the old parity information from drive $D_{11}$. After the old data and old parity data are read, drive controller 12 then writes the new data to the target location on disc drive $D_{12}$. Next, controller 12 performs an Exclusive OR (XOR) operation on the old data read from the target location with the new data written to the target location. The result of that XOR operation is, itself, XOR'ed with the old parity information read from the parity location on disc $D_{11}$. The result of that second XOR operation constitutes the new parity information to be written to the corresponding location in drive $D_{11}$. Therefore, controller 12 must then write the new parity data to disc drive $D_{11}$.

Only after all these steps have been executed does disc drive $D_{11}$ provide a ready signal to controller 12 indicating that the requested write operation has been accomplished in its entirety. Only then can controller 12 move on to perform its next operation.

Modern computer systems also have large cache memories. These memories tend to hold a large portion of information which can satisfy read requests by the computer system. Therefore, write operations make up a large percentage of the interaction between controller 12 and the plurality of disc drives in matrix 14. Thus, the length of time required and the number of steps required for controller 12 to execute a write operation is large and places a heavy burden on controller 12.

In addition, because of the way many application programs are written for computer systems, the data storage systems in those computer systems exhibit what is referred to as locality of reference. In simple terms, locality of reference refers to the characteristic that in many application programs, the activity between a controller, such as controller 12, and the associated disc drives in a mass memory storage system tends to focus only on a small number of drives. In other words, the application programs tend to store and retrieve information from nearby locations in the matrix 14 of disc drives. Thus, typical RAID 5 controllers do not take advantage of the breadth of the interface potential with which they are designed. Rather, the I/O traffic is system 10 is confined to a small number of the interfaces 1-n. This results in significant interface arbitration and control burdening.

Another significant problem with the typical RAID 5 implementation shown in FIG. 1 is presented when one of the disc drives in matrix 14 fails. For example, assume that disc drive $D_{12}$ in FIG. 1 were to fail. In that case, disc drive $D_{12}$ either needs to be repaired, or a new disc drive must be installed in place of disc drive $D_{12}$. In either case, the information stored on disc drive $D_{12}$ is not lost for good. It can be reconstructed using the data on the remaining disc drives in that row, as well as the corresponding redundant data stored in that row. However, the information previously stored on failed disc drive $D_{12}$ must be completely reconstructed and stored on new replacement disc drive $D_{12}$. Such an operation, which is sometimes referred to as rebuilding a disc drive, imposes an enormous burden on controller 12. Controller 12 must read all the data from all disc drives in the corresponding row, use the redundant or parity data and perform the necessary processing to reconstruct the data which must be stored on new disc drive $D_{12}$, and then write the new data to new disc drive $D_{12}$ on a sector-by-sector basis. Such a burden takes an enormous amount of time, and significantly degrades the performance of controller 12. Also, it greatly increases the activity on interface 2, or whichever interface corresponds to the disc drive which is being rebuilt. This is particularly wasteful because drive controller 16 in new disc drive $D_{12}$ sits idle other than when it receives the occasional reconstructed data from controller 12 for storage.

The traditional disc array 10 shown in FIG. 1 also suffers from other common problems. For example, the granularity and economy is undesirable. In order to add any extra storage to system 10, an entire new row (m+1) of disc drives must be added. This may not be economically feasible or desirable.

Finally, depending on what type of system controller 12 expects to see, the user is confined to that pre-determined system. In other words, if controller 12 is programmed to have a single parity drive per four data drives, that is the type of system to which the user is confined. This leads to a lack of flexibility for the user.

2. Overview of the Present Invention

Figure 2:
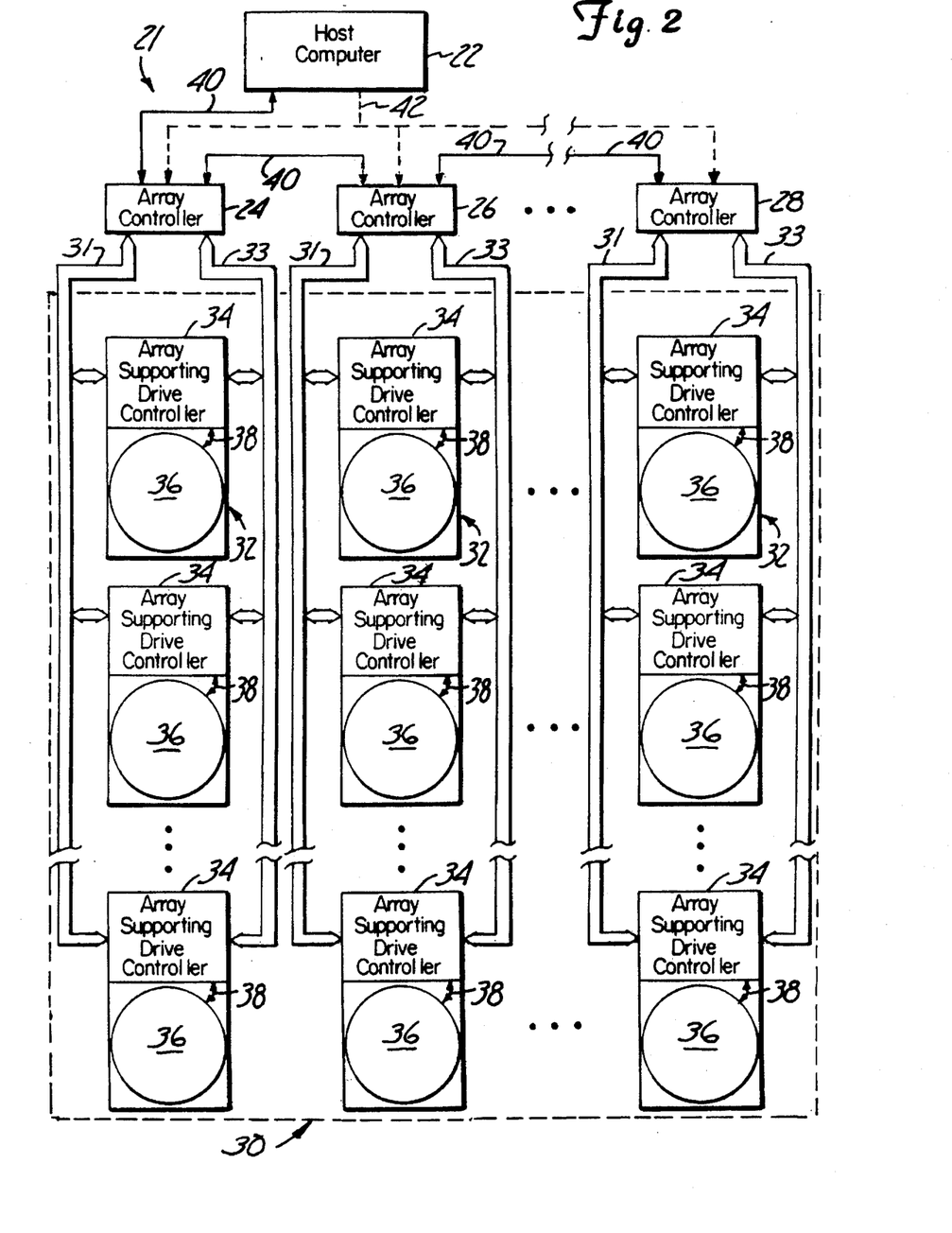
FIG. 2 is a block diagram of a disc drive array according to the present invention.

FIG. 2 shows disc drive array 21 according to the present invention. Disc drive array 21 includes host computer 22, a plurality of array controllers 24, 26, and 28, and a disc drive matrix 30. Matrix 30 includes a plurality of disc drives 32 each having an array supporting drive controller 34, at least one magnetic disc 36, and means 38, such as a transducer, coupled to controller 34 (indicated by arrow 38) for storing information on magnetic disc 36 and for retrieving information from magnetic disc 36. In addition, all array supporting drive controllers 34 controlled by an array controller (such as array controller 24) are coupled to one another so that they can perform array support functions in combination with one another.

Host computer 22 is coupled to each of the array controllers 24, 26 and 28 by any suitable interface. In addition, the array controllers 24, 26, and 28 are coupled to one another. Host computer 22 can be coupled to the array controllers 24, 26, and 28 by a serial interface indicated by arrows 40, or by a series of parallel interfaces indicated by dashed arrow 42. In one preferred embodiment, the coupling between host computer 22 and the array controllers 24, 26, and 28 is accomplished by a Fibre Channel interface or a SCSI interface. Host computer 22 sends command, data and request signals to array controllers 24, 26, and 28. Based on the information received from host computer 22, array controllers 24, 26, and 28, control the string of disc drives to which they are attached to accommodate host computer 22.

In the preferred embodiment shown in FIG. 2, the present invention provides a fundamentally different model of a disc drive array than the traditional model. Each array controller, 24, 26, and 28, controls an individual string of disc drives. Rather than having six to ten disc interfaces in parallel controlling a matrix of drives, the present invention provides access not only by the array controller 24, 26, and 28 to the array supporting drive controllers 34, but by one array supporting drive controller 34 to the others through a pair of high speed serial interfaces 31 and 33 such as Fibre Channel interfaces. This fundamentally different model provides significant advantages over the traditional model. These advantages will be explained in detail later in the specification.

Figure 3:
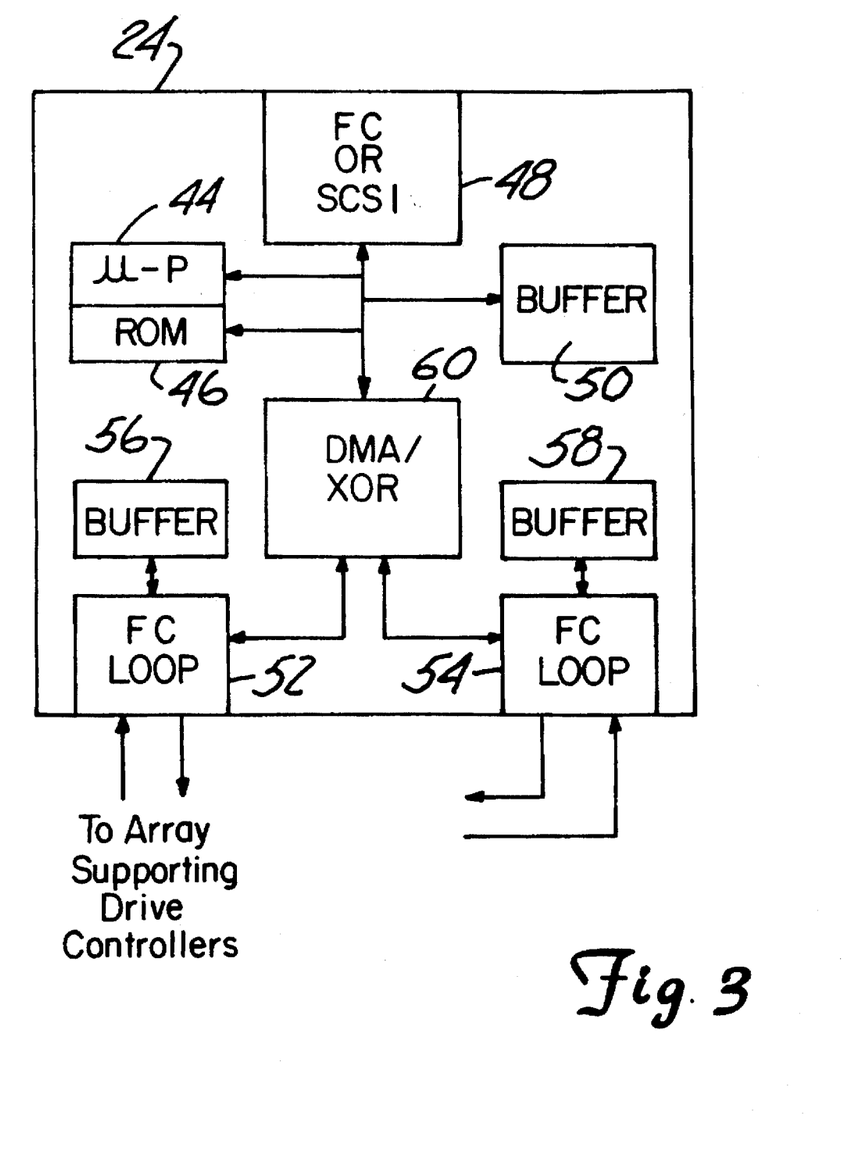
FIG. 3 is a more detailed block diagram of an array controller according to the present invention.

FIG. 3 shows one embodiment of an array controller, such as array controller 24. Array controller 24 includes, in this preferred embodiment, microprocessor 44 with associated memory 46 for storing controller code. Memory 46 can be DRAM, EPROM or ROM or any combination thereof. The interface with host computer 22 and the other array controllers 26 and 28 is accomplished through a Fibre Channel or SCSI interface circuit 48. Array controller 24 also has an associated cache or buffer memory 50. The interface between controller 24 and its associated disc drives is provided by, in this preferred embodiment, single chip Fibre Channel loop interfaces, 52 and 54, each having a dedicated buffer, 56 and 58, respectively. Finally, array controller 24 includes a Direct Memory Access (DMA) controller as well as Exclusive Or (XOR) logic 60.

In this preferred embodiment, all of the logic on array controller 24 is known logic and can be implemented to fit into a single 3.5 inch disc form factor. Also, the individual disc drives associated with array controller 24 are preferably mechanically and electrically connected to the array controller 24 and to one another via either cables or a common back plane.

3. Overview Of The Primary Array Support Functions

The present disc array system implements four primary array support functions or commands. Those four commands include:

1. Log Write operations (LWRITE);
2. Exclusive Or Read (XREAD);
3. Exclusive Or Write (XWRITE); and
4. Rebuild Disc (BLDME).

Each of these four commands are provided by array controller 24 to its associated string of drives, and these commands greatly reduce the burden on array controller 24 in controlling the disc drive array.

Figure 4:
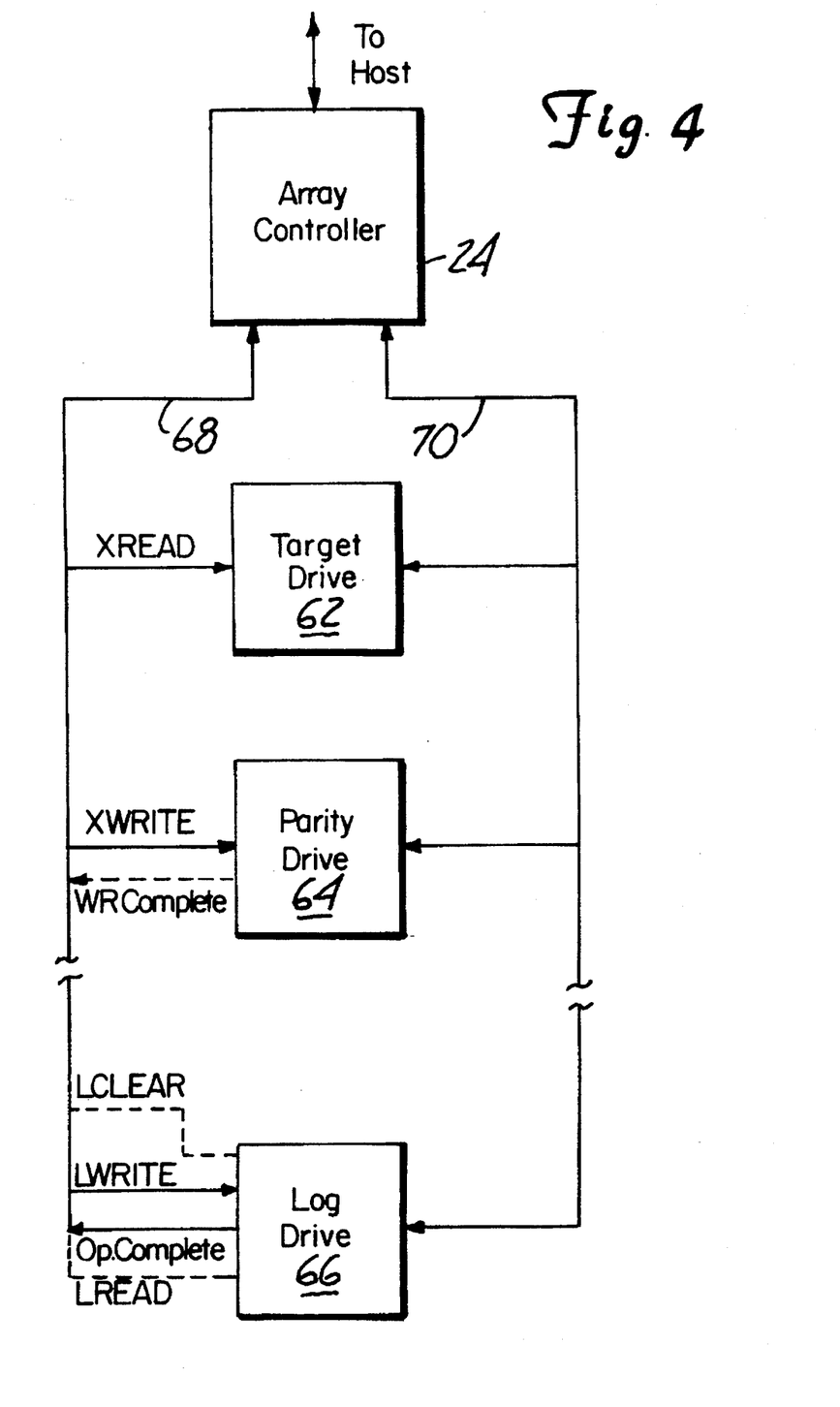
FIG. 4 is a block diagram illustrating a log operation of the present invention.

FIG. 4 is a block diagram showing array controller 24 coupled to its associated string of drives 62, 64 and 66. FIG. 4 illustrates the overall operation of the XREAD, XWRITE and LWRITE commands. In this embodiment, array controller 24 is coupled to drives 62, 64 and 66 through two Fibre Channel interfaces 68 and 70.

In order to perform a typical write operation, the traditional RAID 5 controller must perform at least six steps, as discussed above. However, array controller 24 of the present array need only issue an XREAD command, an XWRITE command and an LWRITE command. Because the drive controllers in disc drives 62, 64 and 66 are coupled to one another by high speed serial interfaces 68 and 70, and can consequently communicate with one another in a meaningful way, all other processing is done within the controllers of disc drives 62, 64 and 66, rather than in array controller 24.

For example, when array controller 24 receives a command from host computer 22 indicating that data should be written to a target location in the string of disc drives associated with array controller 24, array controller 24 takes the following steps. First, array controller 24 sends the data and the XREAD command to disc drive 62 containing the target location to which the data is to be stored (target drive 62). This initiates writing of the new data to the target location. Array controller 24 also, at generally the same time, issues an XWRITE command to parity drive 64 and an LWRITE command to log drive 66. The XWRITE command initiates determination and storage of new parity information to parity drive 64. The LWRITE command initiates logging of the write operation. Once the write operation is logged, array controller 24 is free to process other operations.

4. Logging Operations

In this preferred embodiment, log drive 66 is a hot spare disc drive in the array which also helps increase input/output (I/O) performance. In traditional disc drive arrays, hot spares are commonly included, but are idle or not used until one of the disc drives in the array has failed. The present invention employs the hot spare disc drive as a log drive to improve overall I/O performance.

The LWRITE command issued to log drive 66 causes log drive 66 to log the information representing the write operation currently being executed at target drive 62 and parity drive 64. The LWRITE command instructs log drive 66 to write the data and other information representative of the write operation to the nearest location possible on log drive 66. The controller in log drive 66 maintains a table (that may be kept in RAM or other memory associated with the drive controller in log drive 66) which identifies the locations in the log drive 66 currently holding information corresponding to a write operation which has not been completed, or at least not successfully completed as yet. Therefore, upon receiving an LWRITE command, log drive 66 simply checks the table and determines the nearest address location which is available on log drive 66 for storing information indicative of the latest write operation.

Log drive 66 then proceeds to store the information at that first available location.

Once the information is stored at the first available location, log drive 66 returns an operation complete (OP COMPLETE) signal to array controller 24 indicating that the logging operation is complete. Since the write operation is completely logged on log drive 66, controller 24 can continue with other tasks while the drive controllers in drives 62 and 64 complete the actual write operation requested.

Once the new data has been written to the target location on target drive 62, and after the new parity data has been written to the parity location on parity drive 64, parity drive 64 sends a write complete (WR COMPLETE) signal to array controller 24 via one of the Fibre Channel interfaces 68 or 70. Upon receiving the WR COMPLETE signal, array controller 24 instructs, log drive 66 to erase its entry in the logging table corresponding to the write operation which has just been completed. Thus, the table indicates that the associated storage location in log drive 66 is again available to store information indicative of a write operation.

In typical operation, the necessary write information can be stored on log drive 66 without log drive 66 ever filling up a single cylinder with data for which the corresponding write operation has yet to be completed. Further, by keeping the table of available locations up to date, there is no need to write in any sequential order on log drive 66. Writing is simply done in the first available location. This drastically reduces the time required to log data over that required in previous log drives which log by executing typical write operations in sequential order on the log drive.

Since there is no need to write in any sequential order, the present log drive is much faster than any typical write operation because there is no need to wait for a track seek and the corresponding latency (i.e., the time for the disc to turn so that the proper sector is under the write head). Thus, log drive 66 returns the OP COMPLETE signal to array controller 24 quicker than it would be returned in even a single disc drive subsystem which has a dedicated controller, because log drive 66 can log the necessary data and return the OP COMPLETE signal quicker than a normal write operation can be performed.

In the preferred embodiment, log drive 66 records the date and time that the write operation was initiated and keeps its logging table in some temporal order. Therefore, should something go wrong with the write operation, and should parity disc 64 fail to provide array controller 24 with the WR COMPLETE signal, or should any of the disc drives signal array controller 24 that something adverse has happened during the write operation, array controller 24 can easily recreate the previous and uncompleted write operations by accessing the information representative of those write operations on log drive 66.

Upon determining that there has been a problem with a write command, controller 24 issues the LREAD command to log drive 66 which causes drive 66 to send the log file to array controller 24. The log file is processed after an abnormal shutdown or an I/O error so that the desired write operation can be reinitiated by array controller 24.

Once array controller 24 receives the WR COMPLETE signal from parity drive 64, array controller 64 issues an LCLEAR command which causes log drive 66 to clear the table entry associated with the write request because the operation has been successfully completed. This keeps the log file up to date by dynamically purging it of records no longer needed. It also keeps log drive 66 on a single cylinder, if possible, which makes for very quick and efficient LWRITE operations.

5. XREAD and XWRITE Commands a. The XREAD Command

Figure 4A:
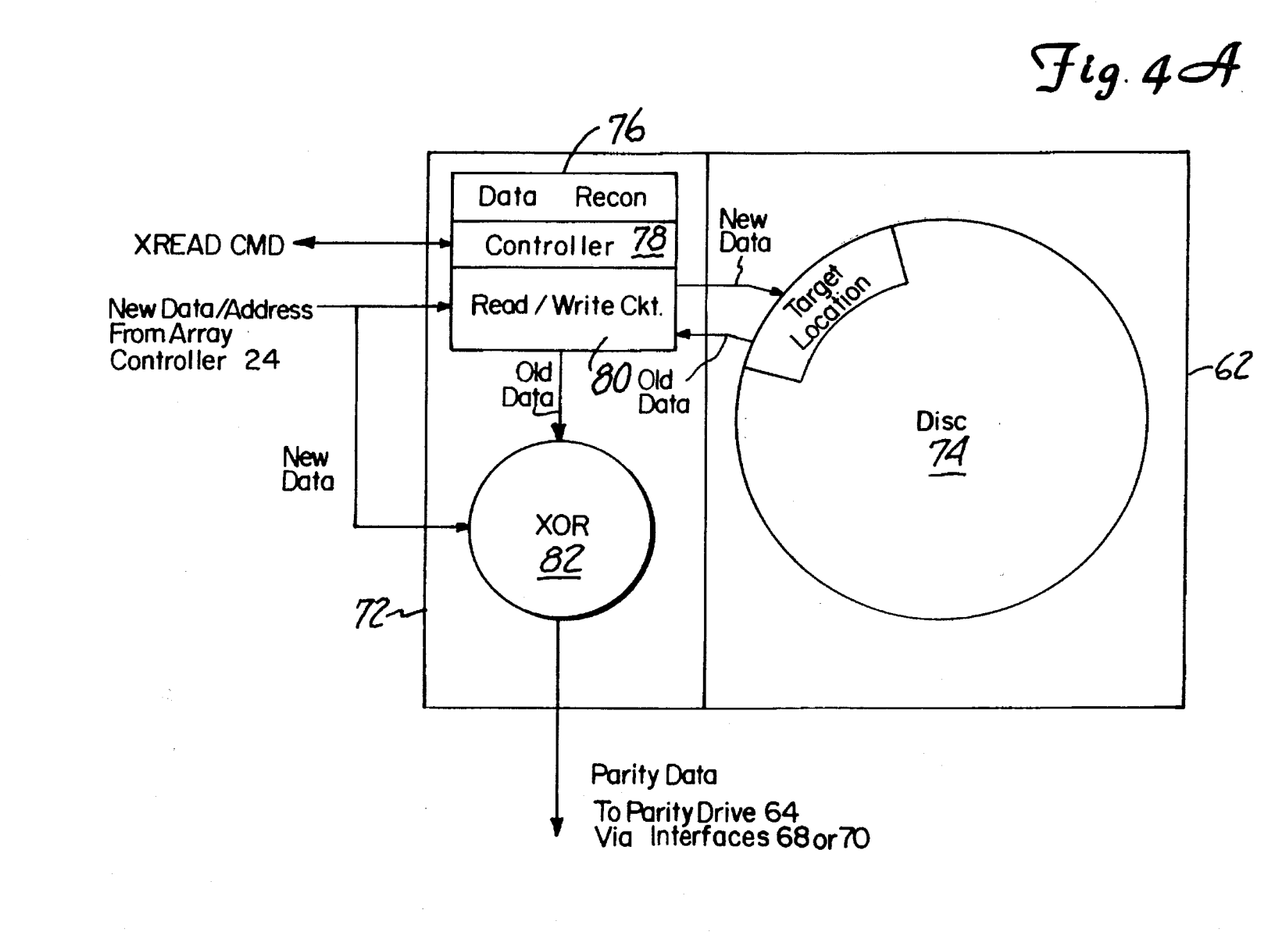
FIG. 4A is a block diagram illustrating an array support function of the present invention.

FIG. 4A is a block diagram which more specifically illustrates the XREAD command. FIG. 4A shows target drive 62 which includes controller 72, and disc 74. Controller 72 includes data reconstruction logic 76, controller logic 78, read/write circuit 80, and Exclusive OR (XOR) circuitry 82.

The XREAD command illustrated in FIG. 4A writes the new data to the target location on disc 74 in a read-modify-write operation. When a sector is to be written to the target location, array controller 24 sends the new data to target drive 62 using the XREAD command. Controller 72 in target drive 62 then performs four steps. First, control circuitry 78 controls read/write circuit 80 to read the old data from the target location on disc 74. Then, control circuitry 78 controls read/write circuit 80 to write the new data to the target location on disc 74. Control circuitry 78 then causes read/write circuit 80 to send the old data read from the target location to XOR circuit 82 where the old data is Exclusive OR'ed with the new data provided from array controller 24. The result of the XOR operation implemented in XOR circuit 82 is provided to parity drive 64 via one of the Fibre Channel interfaces 68 or 70.

In this preferred embodiment, the XOR operation in XOR circuit 82 takes place as the data is being read from the target location in disc 74. Drive 62 then immediately sends the result of the operation to parity drive 64 and then writes the new data to the target location on disc 74. Depending on the amount of information to be written to the target location on disc 74, target drive 62 typically has time to perform all of these functions before the disc fully rotates. Controller 72 signals array controller 24 when new data is properly written to the target location.

b. The XWRITE command

Figure 4B:
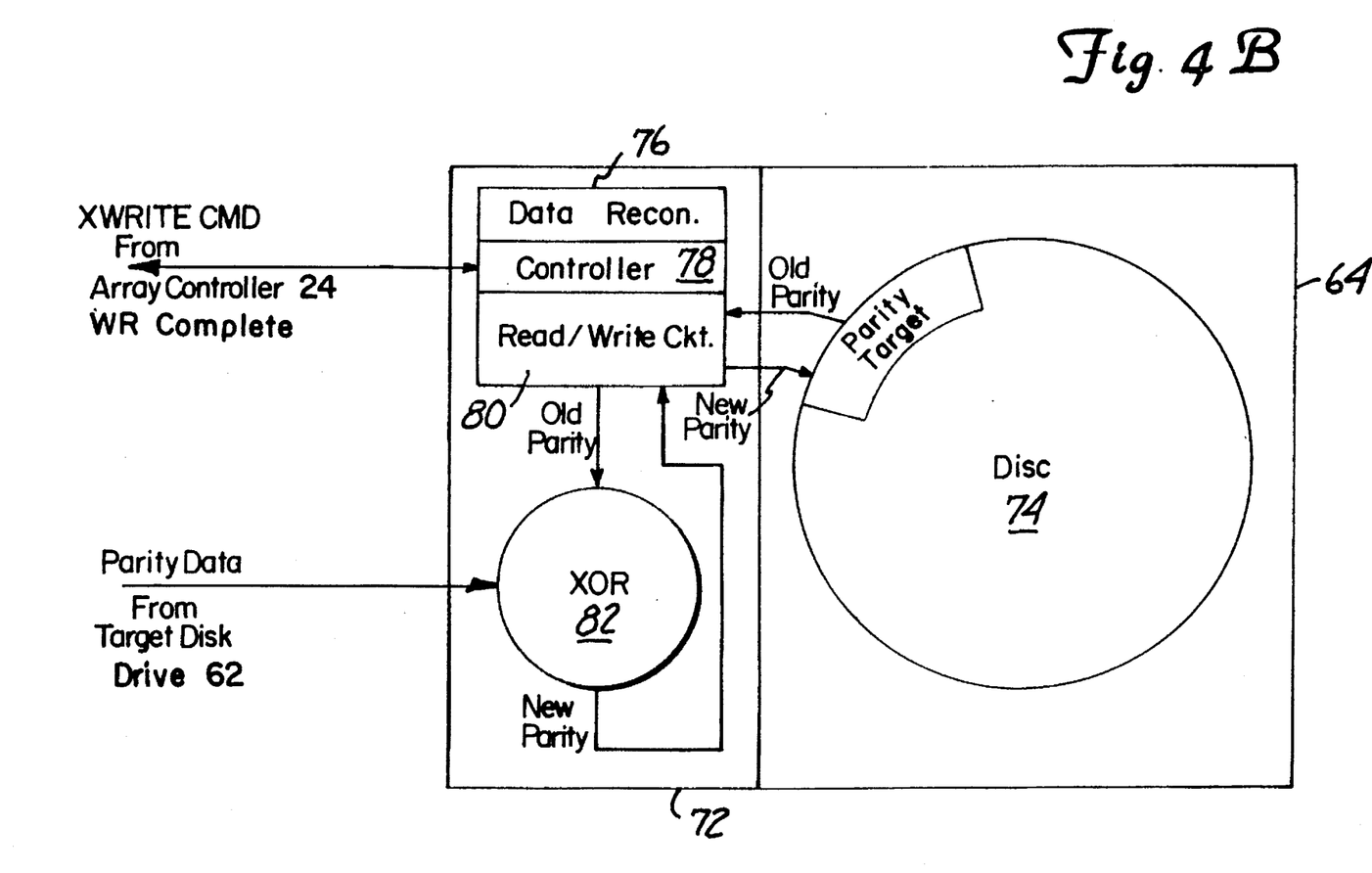
FIG. 4B is a block diagram illustrating an array support function of the present invention.

FIG. 4B is a block diagram which illustrates the XWRITE command. The XWRITE command updates the parity information stored on disc drive 64 which corresponds to the sector of new data written to the target location on target drive 62. Since all of the disc drives in the present system are essentially identical, corresponding components of drive 64 have been similarly numbered to those in drive 62.

The disc drive which contains the parity data corresponding to the sector of new data to be written to the array (in this case disc drive 64) is referred to as the parity drive. Parity drive 64 receives the XWRITE command from array controller 24 with no data. Upon receiving the XWRITE command, control circuitry 78 causes read/write circuit 80 to read old parity information from the parity target location corresponding to the location of the new data to be written to target drive 62. The old parity information read from the parity target location is stored in a buffer in controller 72 of disc drive 64.

Upon receiving the parity data as a result of the XOR operation performed in disc drive 62, the incoming parity data is Exclusive OR'ed with the old parity data stored in the buffer of controller 72 in disc drive 64. The result of that XOR operation is provided back to read/write circuit 80 and is written, as the new parity information, to the parity target location on disc 74 in disc drive 64. After the new parity information is written to the parity location, the control circuitry 78 in disc drive 64 sends the WR COMPLETE signal to array controller 24 indicating that the write operation has been successfully completed.

With the implementation of the two commands XREAD and XWRITE, the complete RAID 5 read-modify-write operation is completed with the array controller 24 doing little more than it would for a standard write operation in a system having a single disc drive. By employing a high-speed serial interface, 68 or 70, rather than multiple parallel interfaces (1-n), all disc drives are on the same communications path and can send data to and from one another. This eliminates the considerable overhead associated with array controller 24 having to accept the intermediate results of the read-modify-write operation and schedule one or two additional operations on a separate disc drive to complete the write operation. The time savings with the present invention are significant.

For example, consider a typical RAID 5 system using discs which rotate at 5400 rpm. Ignoring everything except latency, a read-modify-write operation would take:

| | | |
|---|---|---|
| 1. Reading old data | | 5.5 ms |
| 2. Reading old parity information | | 5.5 ms |
| 3. Writing new data and parity | | 11.0 ms |
| | Total | 22.0 ms |

Thus, there is a total of 22 milliseconds before the array controller in a typical RAID 5 system would receive an operation complete status signal from the disc drives. This estimate even assumes that two write operations can be done simultaneously. However, using the XREAD and XWRITE commands, the time is reduced to:

| | | |
|---|---|---|
| 1. Read old data, XOR and send to parity disc | | 5.5 ms |
| 2. Read old parity (done at the same time as step 1) | | 0.0 ms |
| 3. Write new data and parity | | 11.0 ms |
| | Total | 16.5 ms |

The savings of 5.5 milliseconds is a function of the rotation speed of the discs. Thus, this technique enables the array user to profit the most from the highest rotation speeds. Moreover, the first estimate, with a traditional RAID 5 system, assumes the best possible circumstances. Since the controller actually has to receive the old data and parity, XOR the blocks and then initiate two more commands, it has far more work to do than is called for in the latter case. It is actually unlikely during periods of heavy I/O traffic that the controller of the typical RAID 5 system could be quick enough to initiate the write operation on the parity disc before another rotation is lost on the parity disc. The present invention does not have that problem since there is no waiting for intermediate stages of the read-modify-write operation. Thus, the present invention provides significant time savings.

6. BLDME Command

Figure 5:
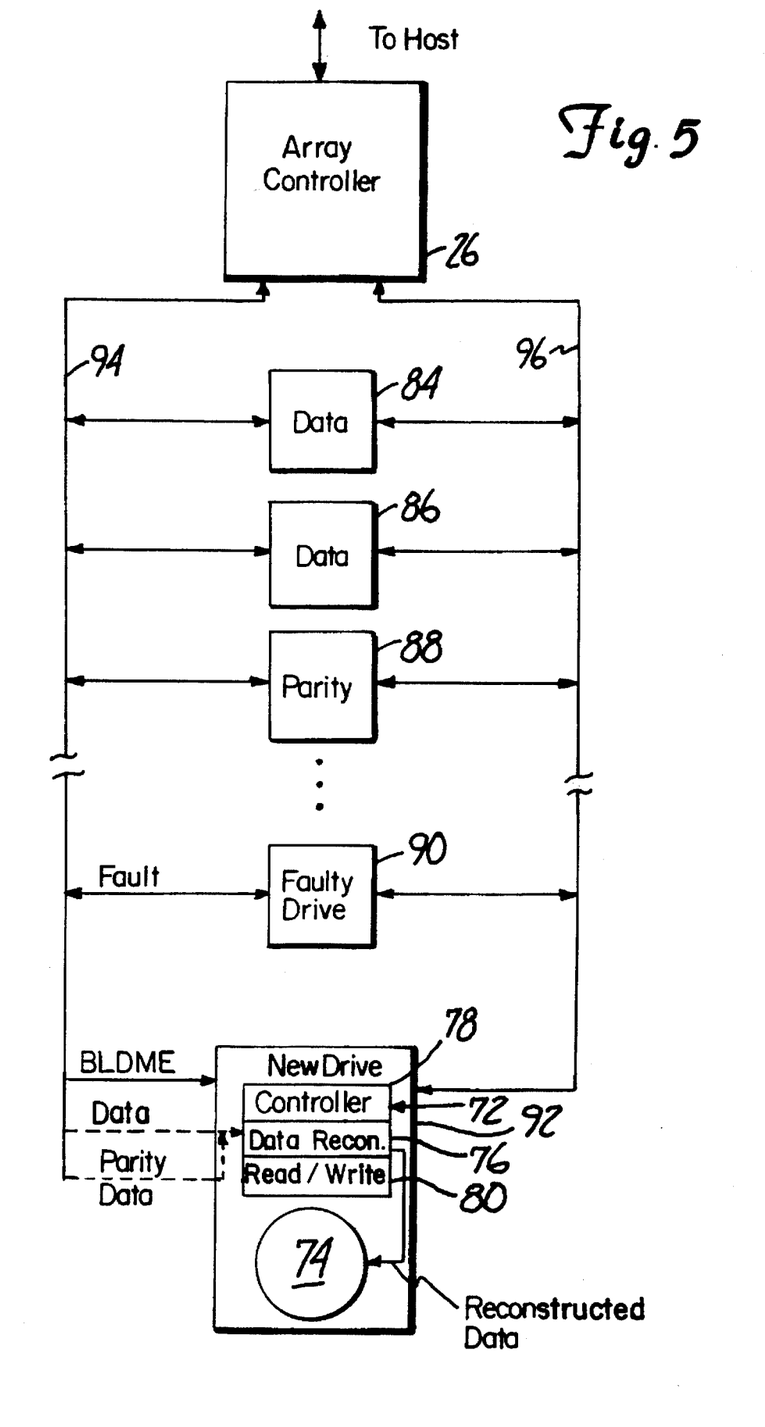
FIG. 5 is a block diagram illustrating a build operation of the present invention.

FIG. 5 is a block diagram illustrating the BLDME command. The BLDME command is initiated when a faulty drive is detected, and provides for the reconstruction of data previously contained on the faulty drive.

FIG. 5 includes an array controller, such as array controller 26, coupled to its associated string of drives 84, 86, 88, 90 and 92. Array controller 26 is coupled to the drives via serial interfaces 94 and 96. In FIG. 5, disc drives 84 and 86 contain data in associated sectors. Disc drive 88 includes a sector which contains parity data associated with the sectors of data contained in disc drives 84 and 86. Disc drive 90 is representative of a faulty drive which has failed for some mechanical or electrical reason, array controller 26 having detected the failure. Disc drive 92 is a replacement disc drive used to replace faulty drive 90. In one preferred embodiment, disc drive 92 is a hot spare disc drive which has been included in the string of disc drives controlled by array controller 26. In another embodiment, disc drive 92 is representative of faulty drive 90 which has been repaired. In yet another preferred embodiment, faulty drive 90 is completely mechanically removed from the string of drives controlled by array controller 26, and drive 92 is installed in place of faulty drive 90. As indicated with respect to drives 62, 64 and 66 in FIG. 4, all of disc drives 84, 86, 88, 90 and 92 are identical. All contain data reconstruction circuitry 76 for reconstructing data.

Once faulty drive 90 has been replaced by replacement drive 92, by whatever means, replacement drive 92 must be rebuilt to reflect the data previously stored on faulty drive 90. The data is rebuilt using the data residing on the remaining disc drives 84 and 86, as well as the redundant data residing, for the particular sector illustrated in FIG. 5, on drive 88. In the past, this rebuilding function has been performed in the controller of the disc drive array. However, this creates an immense I/O burden on the controller. The controller must schedule read operations from all of the disc drives, it must perform the necessary XOR functions, it must write the new data to the replacement drive while, of course, continuing to service its normal I/O workload.

The BLDME command addresses this immense burden by having the controller on replacement drive 92 perform the reconstruction operations. This does not place any additional burden on the disc array as a whole because the controller of replacement drive 92 would otherwise be idle during most of the reconstruction task, being active only when it is called upon to write the reconstructed data provided by the array controller to its discs.

Upon receiving the BLDME command from array controller 26, replacement drive 92 begins reconstructing itself by issuing read commands to the other drives on one of the specified serial interfaces 94 or 96. Replacement drive 92 can do this substantially independently of array controller 26 since the controllers of all of the disc drives 84, 86, 88 and 92 can communicate with one another via the serial interfaces 94 and 96.

Upon receiving the requested data from the other drives in the string of drives, the data reconstruction circuitry 76 in the controller of replacement drive 92 performs the necessary XOR steps to reconstruct the original contents of the faulty drive 90 in a known manner. Thus, the replacement drive 92 is entirely rebuilt and the missing data is restored.

Before a replacement drive replaces the failed drive, or while replacement drive 92 is reconstructing itself, array controller 26 may receive a command from host computer 22 to access information previously stored on the failed drive. If replacement drive 92 has already reconstructed the requested data, array controller 26 services the request from host computer 22 by accessing the appropriate portion of replacement drive 92. Otherwise, array controller 26 returns a status signal to host computer 22 which indicates that host computer 22 must do a disable mode read (or write). In this mode, data and redundant data must be read from the other drives and the lost data must be reconstructed. This can be done by the controller in replacement drive 92 (if the drive is present), or by the controller in another drive. If two or more requests are made of the replacement drive 92, those requests can be serviced by controllers in other drives. In this way, the requests of data previously stored on the failed drive can be distributed over all functional drives to further relieve the burden on array controller 26 and expedite operation.

With the BLDME command, nearly the entire burden of reconstructing faulty disc drive 90 is removed from array controller 26 in the system. It is placed on the controller in the replacement drive 92 which would otherwise have been idle for nearly the entire reconstruction operation. It could also be placed on other drive controllers in the system. Therefore, the BLDME command greatly decreases the burden on array controller 26 and increases performance of the system.

CONCLUSION

The present invention overcomes previous fundamental limitations which have proven to be barriers to the successful implementation of high level RAID systems. The present invention moves many of the array support functions, which often overburden the array controller, to the individual disc drive controllers to alleviate the burden on the array controller and improve overall performance of the system.

The present invention demonstrates superior performance in both high data rate systems, previously confined to RAID level 3 implementations, and to high transaction processing systems, which were typically confined to RAID 5 implementations. The present invention gives the user the ability to decide the number of data drives per parity drive in a system. The present invention also allows the user to add discs in reasonable increments, in fact any increment the user desires. The present invention also allows controller performance and economies to be maintained even with an increase in storage size. Finally, the present invention can be implemented in a typical size drive so that very large controllers that fit no standard form factor are avoided. To increase data storage, multiple array controllers can be put into the connection with the host computer, and additional disc drives or strings of disc drives can be added to the system.

Since the present system provides dual serial interfaces to the disc drives, the array controller can dynamically balance the load on each interface. This is especially important in achieving very high data rates.

The four array support functions, XREAD, XWRITE, BLDME and LWRITE are each performed in the controllers of the individual disc drives. While either or both the BLDME and LWRITE functions could still be performed in the array controller, moving them to the controllers of the individual disc drives is preferred. Having the individual disc drives perform these read-modify-write, reconstruction, and update and logging operations relieves the array controller of much of the array specific activity that has contributed to the poor performance of RAID 5 systems. Since the disc drives on the serial interface can talk to one another, data that would otherwise go back to the controller before being scheduled for writing to the parity disc is sent directly to the appropriate disc drive. This eliminates both I/O parity on the interface and the number of events the controller must manage. The net result is better performance for less cost.

Although the present invention has been described with reference to preferred embodiments, workers skilled in the art will recognize that changes may be made in form and detail without departing from the spirit and scope of the invention.

What is claimed is:

1. A disc array, comprising:

a plurality of disc drives including a spare disc drive, each disc drive including:

a magnetic disc for storing information; and a drive controller for writing information to the magnetic disc and for retrieving information from the magnetic disc, the drive controller including array support means for performing array support functions to support the disc array;

connection means, coupled to the drive controller in each of the plurality of disc drives, for connecting the drive controllers so that the drive controllers can communicate with one another to perform the array support functions in cooperation with one another;

array control means, coupled to the drive controller in each of the plurality of disc drives, for controlling the disc drives to perform a write operation to store information in a target location on the magnetic discs; and wherein the array controller provides the spare disc drive with logging information indicative of new information to be written to the target location during a data write command, the data write command and a parity write command.

2. The disc array of claim 1 wherein the connection means comprises:

a Fibre Channel interface.

3. The disc array of claim 1 wherein the array support means on the spare disc drive comprises:

writing means for writing the logging information to a magnetic disc in the spare disc drive.

4. The disc array of claim 3 wherein the array support means in the spare disc drive comprises:

log signalling means, coupled to the connecting means, for providing the array controller with a log complete signal indicating whether the logging information has been written to the magnetic disc in the spare disc drive.

5. The disc array of claim 4 wherein the array controller comprises:

detection means, coupled to the connection means, for detecting a failed write operation based on the data write complete signal and the parity write complete signal.

6. The disc array of claim 5 wherein the array controller comprises:

retrieving means for retrieving the logging information when the detection means has detected the failed write operation.

7. The disc drive of claim 6 wherein the array controller resends the new information, the data write command, and the parity write command based on the logging information retrieved.

8. The disc array of claim 3 wherein the array support means in the spare disc drive comprises:

location determining means for determining a first available location on a magnetic disc in the spare disc drive.

9. The disc array of claim 8 wherein the location determining means comprises:

table means for keeping a table having table entries indicating locations on the magnetic disc in the spare disc drive which hold logging information corresponding to write operations which have not yet been completed.

10. The disc drive of claim 9 wherein the table means comprises:

means for clearing the table entries corresponding to locations on the spare disc drive holding logging information indicative of completed write operations so that the table indicates locations on the spare disc drive which are available to store logging information indicative of subsequent write operations.

11. The disc array of claim 1 wherein the plurality of disc drives are capable of independent failure.

12. The disc drive of claim 11 wherein the array controller comprises:

receiving means for receiving information to be stored in the disc array and generating redundant data based on the information to be stored, the array controller providing the information to be stored and the redundant data to the plurality of disc drives, the plurality of disc drives storing the information to be stored and the redundant data.

13. The disc array of claim 12 wherein each of the drive controllers of the plurality of disc drives includes:

means for accessing the information stored and corresponding redundant data stored on the other of the plurality of disc drives through the connecting means.

14. The disc drive of claim 13 wherein the array controller comprises:

failure detection means for detecting a failure of one of the plurality of disc drives.

15. The disc drive of claim 14 wherein each of the drive controllers of the plurality of disc drives includes:

reconstruction means for reconstructing the information and redundant data on a failed disc drive based on the information and corresponding redundant data stored on the other of the plurality of disc drives.

16. The disc drive of claim 15 wherein the plurality of disc drives comprises:

a replacement disc drive for replacing a failed disc drive so that when one of the plurality of disc drives fails, the replacement disc drive reconstructs and stores the data previously stored on the failed disc drive based on the information and redundant data accessed from the other of the plurality of disc drives.

17. The system of claim 16 wherein the failed disc drive is repaired, and wherein the replacement disc drive comprises the failed repaired disc drive.

18. The disc array of claim 15 wherein the reconstruction means comprises:

means for reconstructing the information and redundant data stored on the failed disc drive substantially independently of the array controller.

19. The system of claim 16 wherein the failed disc drive is removed from the disc array and wherein the replacement disc drive comprises:

a new disc drive.

20. The system of claim 16 wherein the plurality of disc drives includes a spare disc drive and wherein the replacement disc drive comprises the spare disc drive.

21. A method of controlling a disc array having an array controller and a plurality of disc drives each disc drive including a disc drive controller and at least one magnetic disc, the method comprising:

providing a spare disc drive;

connecting the plurality of disc drives and the spare disc drive to communicate with one another;

initiating a write operation by sending a write command to a disc drive in the plurality of disc drives and to the spare disc drive, the write command representing data and a target location in the disc array to which the data is to be written;

sending logging information representative of the data and the write command to the spare disc drive;

logging the logging information at an available location on the spare disc drive; and sending a continue signal to the array controller indicating that the logging information has been logged on the spare disc drive.

22. The method of claim 21 wherein logging comprises:

logging the logging information at the first available location on the spare disc drive.

23. The method of claim 21 and further comprising:

writing the data to the target location using the controller on the disc drive containing the target location.

24. The method of claim 23 and further comprising:

detecting a failed write operation when the controller on the disc drive containing the target location has failed to write the data to the target location;

retrieving the logging information logged on the spare disc drive when the failed write operation is detected; and reinitiating the write operation with the array controller, based on the logging information retrieved.

25. The method of claim 23 wherein logging comprises:

updating table entries in a table to indicate locations on the spare disc drive storing write logging information which represents data that has not been written to corresponding target locations.

26. The method of claim 25 and further comprising:

clearing table entries in the table to indicate locations on the spare disc drive which are available to store logging information representative of subsequent write commands and data.

27. The method of claim 26 wherein clearing comprises:

clearing table entries corresponding to locations on the spare disc drive holding logging information representative of data which has already been written to the target location.

28. An array of disc drives, comprising:

a plurality of disc drives, each disc drive including:
  a disc for storing data; and
  a drive controller for retrieving data from the disc and for recording data on the disc;

an array controller, coupled to the plurality of disc drives, for controlling the array, the array controller receiving incoming data and providing portions of the incoming data to various disc drives in the plurality of disc drives in the array, the array controller also generating redundant data based on the portions of the incoming data stored on the disc drives and providing the redundant data to the disc drives;

connecting means for connecting the drive controllers of the plurality of disc drives to communicate with one another; and wherein the drive controllers of the plurality of disc drives each include reconstruction means for accessing data and redundant data stored on other disc drives in the plurality of disc drives and for reconstructing data based on the data and redundant data accessed and for storing the reconstructed data.

29. The apparatus of claim 28 wherein the reconstruction means accesses the data and redundant data stored on the other disc drives via the connection means and reconstructs the data substantially independently of the array controller.

30. A disc drive data storage system, comprising:

a plurality of disc drives each including a drive controller and a magnetic disc, the plurality of disc drives being capable of independent failure;

an array controller coupled to the plurality of disc drives, the array controller receiving incoming data and generating redundant data based on the incoming data, the array controller providing the incoming data and the redundant data to the plurality of disc drives, the plurality of disc drives storing the incoming data and the redundant data;

connecting means for connecting the plurality of disc drives for communication with one another;

wherein each of the drive controllers of the plurality of disc drives includes means for accessing the data and corresponding redundant data stored on the other disc drives through the connecting means, so that when a disc drive fails, a replacement disc drive reconstructs and stores the data previously stored on the failed disc drive based on the redundant data accessed and based on the data accessed from the other disc drives.

31. The system of claim 30 wherein the failed disc drive is repaired, and wherein the replacement disc drive comprises the failed repaired disc drive.

32. The system of claim 30 wherein the failed disc drive is removed from the system and wherein the replacement disc drive comprises:

a new disc drive.

33. The system of claim 30 wherein the plurality of disc drives includes a spare disc drive and wherein the replacement disc drive comprises the spare disc drive.

34. The system of claim 30 wherein the means for accessing includes means for accessing the data and corresponding redundant data so that one of the plurality of disc drives reconstructs and provides requested data previously stored on the failed disc drive.

35. The system of claim 34 wherein the means for accessing includes means for accessing data and corresponding data so that one of the plurality of disc drives reconstructs data requested from the replacement disc drive while the replacement disc drive is reconstructing and storing the data previously stored on the failed disc drive.

36. A method of reconstructing a failed disc drives in a disc drive storage system comprising a plurality of disc drive each including a drive controller and a magnetic disc and an array controller coupled to the plurality of disc drives, the plurality of disc drives being capable of independent failure, the method comprising:

receiving, at the array controller, incoming data and generating redundant data based on the incoming data;

providing the incoming data and the redundant data to the plurality of the disc drives;

storing the incoming data and the redundant data at the plurality of disc drives;

connecting the plurality of disc drives for communication with one another;

using a replacement disc drive for accessing the data and corresponding redundant data stored on the other disc drives through the connecting means, so that the replacement disc drive reconstructs and stores the data previously stored on the failed disc drive based on the redundant data accessed and based on the data accessed from the other disc drives.

\* \* \* \* \*